(12) United States Patent
Seo et al.

(10) Patent No.: US 11,642,918 B2
(45) Date of Patent: May 9, 2023

(54) TIRE INCLUDING SEALANT LAYER AND SOUND-ABSORBING MATERIAL LAYER

(71) Applicant: HANKOOK TIRE & TECHNOLOGY CO., LTD., Seoul (KR)

(72) Inventors: Byeongho Seo, Daejeon (KR); Dami Jeong, Daejeon (KR); Changhwan Kang, Daejeon (KR); Hakjoo Kim, Daejeon (KR)

(73) Assignee: HANKOOK TIRE & TECHNOLOGY CO., LTD.

( * ) Notice: Subject to any disclaimer, the term of this patent is extended or adjusted under 35 U.S.C. 154(b) by 190 days.

(21) Appl. No.: 16/669,486

(22) Filed: Oct. 30, 2019

(65) Prior Publication Data

US 2020/0180367 A1    Jun. 11, 2020

(30) Foreign Application Priority Data

Dec. 11, 2018  (KR) .................. 10-2018-0158875

(51) Int. Cl.
*B60C 19/00* (2006.01)
*B60C 19/12* (2006.01)

(52) U.S. Cl.
CPC .......... *B60C 19/002* (2013.01); *B60C 19/122* (2013.01)

(58) Field of Classification Search
CPC ....... B60C 19/002; B60C 19/122; B60C 5/00; B29D 30/06
See application file for complete search history.

(56) References Cited

U.S. PATENT DOCUMENTS

| | | | |
|---|---|---|---|
| 8,387,670 B2* | 3/2013 | Tanno | B60C 19/002 152/157 |
| 2016/0121648 A1* | 5/2016 | Parrett | B60B 21/12 164/79 |

(Continued)

FOREIGN PATENT DOCUMENTS

| | | |
|---|---|---|
| CN | 101516643 A | 8/2009 |
| CN | 108621714 A | 10/2018 |

(Continued)

OTHER PUBLICATIONS

Extended European Search Report for Application No. 19203912.1 dated Jun. 4, 2020.

*Primary Examiner* — Jeffrey M Wollschlager
*Assistant Examiner* — Shibin Liang
(74) *Attorney, Agent, or Firm* — Renaissance IP Law Group LLP

(57) ABSTRACT

The present disclosure relates to a tire including a sealant layer and a sound-absorbing material layer, and the tire includes a sound-absorbing material layer which is adhered to an inner surface of the tire and a sealant layer which is disposed between the inner surface of the tire and the sound-absorbing material layer and includes a sealant for adhering the sound-absorbing material layer to the inner surface of the tire.
The tire has noise reduction performance while enabling a self-sealing operation to be carried out when a tire puncture occurs by adhering a sound-absorbing material layer to a sealant layer applied to an inner surface of the tire, improves flowability of the sealant by increasing average pore size of a sound-absorbing material, thereby reducing specific surface area between the sealant and the sound-absorbing material, and prevents fine pieces of the sound-absorbing material from deteriorating function of the sealant and can also maintain noise reduction performance by decreasing (Continued)

adhesion specific surface area between the surface of the nail and the sound-absorbing material even when a nail reaches the sound-absorbing material by penetrating the tire and the sealant.

2 Claims, 2 Drawing Sheets

(56) References Cited

U.S. PATENT DOCUMENTS

| | | | |
|---|---|---|---|
| 2017/0305209 A1* | 10/2017 | Caracino | B60C 5/002 |
| 2018/0141392 A1* | 5/2018 | Schuermann | B60C 19/002 |
| 2018/0272815 A1* | 9/2018 | Seo | B60C 19/122 |
| 2020/0114702 A1 | 4/2020 | Sakakibara | |
| 2020/0180367 A1 | 6/2020 | Seo et al. | |

FOREIGN PATENT DOCUMENTS

| | | |
|---|---|---|
| CN | 108883673 A | 11/2018 |
| EP | 3378680 A1 | 9/2018 |
| JP | 2006188218 A | 7/2006 |
| JP | 3837375 B2 | 10/2006 |
| JP | 2006306302 A | 11/2006 |
| JP | 2008080846 A | 4/2008 |
| JP | 4862918 B2 | 1/2012 |
| JP | 4960966 B2 | 6/2012 |
| JP | 2015107690 A | 6/2015 |
| JP | 2015209198 A | 11/2015 |
| JP | 2017509528 A | 4/2017 |
| JP | 2017534525 A | 11/2017 |
| JP | 2018522780 A | 8/2018 |
| JP | 2018158714 A | 10/2018 |
| KR | 101861476 B1 | 7/2018 |
| WO | 2017076531 A1 | 5/2017 |
| WO | 2017163219 A1 | 9/2017 |
| WO | 2018146886 A1 | 8/2018 |

* cited by examiner

TIRE INCLUDING SEALANT LAYER AND SOUND-ABSORBING MATERIAL LAYER

CROSS-REFERENCE TO RELATED APPLICATION

This application claims priority to Korean Patent Application No. 10-2018-0158875, filed on Dec. 11, 2018, the disclosure of which is incorporated by reference herein in its entirety.

TECHNICAL FIELD

The present disclosure relates to a tire including a sealant layer and a sound-absorbing material layer, and more specifically, to a tire having noise reduction performance while enabling a self-sealing process to be performed when a flat tire is generated by adhering a sound-absorbing material layer to a sealant layer applied to an inner surface of the tire.

BACKGROUND ART

Development in automobile performance has created desire of a general driver for high speed driving, and various automobile parts and devices have been developed together to this end. A flat tire generated during high speed driving may lead to a large accident of enabling harm to be inflicted upon peripheral other people or objects by greatly threatening safety of a driver and a fellow passenger and allowing a vehicle to lose steering power. In order to prevent this, a tire using a technique of inserting a sealant which can seal a puncture to an inner side of the tire or a technique of adding a solid aid to the flat tire such that a flat tire is not dropped down has been developed and commercialized.

On the other hand, a request for reducing noise generated from a tire is a growing trend according as tightening of government regulations associated with automobile noise and demand for electric vehicles have been expanded. However, a recent tire development trend is that an ultrahigh performance tire in which a tread part of the tire brought into contact with a road surface is formed to have a wide width, and of which sidewalls corresponding to side surfaces of the tire have a low aspect ratio is getting the spotlight.

Such a tire brings about a result of increasing sound pressure associated with noise induction according as a role of appropriately damping an impact transferred from a road surface cannot be performed in structure of the tire itself since an increase in rigidity of sidewalls is caused by structural characteristics. This becomes a cause of decreasing ride comfort during driving by generating air vibration in cavity of the tire, thereby transferring noise to the inside of a vehicle such that a driver senses the noise (hereinafter, noise according to air vibration is referred to as 'resonance sound'). Accordingly, tire manufacturers have suggested a tire of decreasing noise generated inside the tire using a foam (sound-absorbing material) which has open cells and is made of a polyurethane material.

However, the self-sealing tire cannot perform an inherent role since a self-sealing tire has a polymer material applied to an inner portion thereof differently from a general tire, thereby rapidly dropping performance of sealing a puncture portion when mounting a sound-absorbing material capable of decreasing internal noise of the tire on the polymer material. Further, the sound-absorbing material is damaged since interference occurs in coupling of the tire to a wheel when mounting the sound-absorbing material on other portion, particularly when mounting the sound-absorbing material on sidewall portions. The sound-absorbing material may not perform its own function since noise reduction performance is remarkably dropped even when mounting the sound-absorbing material on the wheel.

Therefore, it is required to develop a tire which not only enable a special material to conduct a self-sealing operation when a tire puncture occurs, but also enables the sound-absorbing material attached to the self-sealing tire to reduce resonance sound by mounting the sound-absorbing material on a self-sealing tire.

DISCLOSURE

Technical Problem

The purpose of the present disclosure is to provide a tire which has noise reduction performance while enabling a self-sealing operation to be carried out when a tire puncture occurs by adhering a sound-absorbing material layer to a sealant layer applied to an inner surface of the tire, improves flowability of the sealant by increasing an average pore size of a sound-absorbing material, thereby reducing a specific surface area between a sealant and the sound-absorbing material, and not only prevents fine pieces of the sound-absorbing material from deteriorating function of the sealant, but also enables noise reduction performance to be maintained by decreasing adhesion specific surface area between the surface of the nail and the sound-absorbing material even when a nail reaches the sound-absorbing material by penetrating the tire and the sealant.

Technical Solution

A tire according to an embodiment of the present disclosure includes a sound-absorbing material layer which is adhered to an inner surface of the tire and a sealant layer which is disposed between the inner surface of the tire and the sound-absorbing material layer and includes a sealant for adhering the sound-absorbing material layer to the inner surface of the tire, wherein the sound-absorbing material layer includes a first porous material having an average pore size of 1,200 to 2,400 μm.

The sound-absorbing material layer additionally includes a second porous material stacked on the first porous material, one surface of the first porous material is adhered to the inner surface of the tire by the sealant layer, and the second porous material may be stacked on the other surface of the first porous material.

The second porous material may have an average pore size of 100 to 1,200 μm.

The first porous material has a density of 25 to 40 kg/m$^3$, a hardness of 10 to 20 kgf, a tensile strength of 0.8 kgf/cm$^2$ or more, and an elongation rate of 70% or more, and the second porous material may have a density of 20 to 40 kg/m$^3$, a hardness of 10 to 20 kgf, a tensile strength of 0.8 kgf/cm$^2$ or more, and an elongation rate of 70% or more.

The sound-absorbing material layer has a thickness of 20 to 60 mm, and thickness of the first porous material may be 30 to 90 length % of the total thickness of the sound-absorbing material layer.

Advantageous Effects

A tire according to the present disclosure has noise reduction performance while enabling a self-sealing operation to be carried out when a tire puncture occurs by adhering a sound-absorbing material layer to a sealant layer applied to an inner surface of the tire, improves flowability of the sealant by increasing average pore size of a sound-absorbing material, thereby reducing specific surface area between the sealant and the sound-absorbing material, and prevents fine pieces of the sound-absorbing material from deteriorating function of the sealant and can also maintain noise reduction performance by decreasing adhesion specific surface area between the surface of the nail and the sound-absorbing material even when a nail reaches the sound-absorbing material by penetrating the tire and the sealant.

MODE FOR INVENTION

Figure 1:
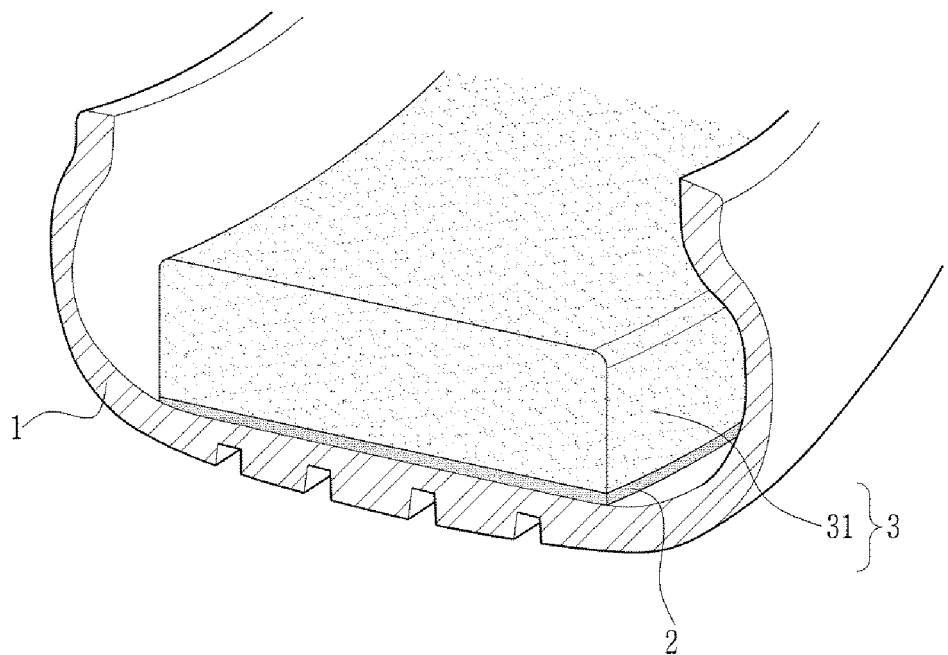
FIG. 1 is a cutting perspective view illustrating a tire according to an embodiment of the present disclosure.

Hereinafter, the embodiments of the present disclosure will be described in detail with reference to the accompanying drawings so that the present disclosure can be easily realized by those skilled in the art. However, the present disclosure can be implemented in various different forms and is not limited to the embodiments and drawings described herein.

A tire according to an embodiment of the present disclosure includes a sound-absorbing material layer which is adhered to an inner surface of the tire and a sealant layer which is disposed between the inner surface of the tire and the sound-absorbing material layer and includes a sealant.

The tire is a sealant tire which is capable of being driven without a need for allowing a driver to get off the vehicle on a road shoulder during driving to replace the tire by applying a sealant including a special polymer material to an inner liner inner surface (cavity of the tire), thereby allowing the sealant to immediately seal a puncture portion to prevent air leakage when a tire puncture occurs in a tire tread portion by a nail or a sharp foreign material since a sealant including a special polymer material is applied to an inner liner inner surface (cavity of the tire).

Further, the tire is a silent tire which reduces resonance sound generated when an air layer inside the tire during driving is excited by vibration generated from a road surface of the tire since a foam, i.e., a porous material having a plurality of pores is adhered to an inner part of the tire.

However, there is a problem as follows so as to simultaneously achieve such two performances. Namely, a plurality of fine pores are densely distributed in the general sound-absorbing material since a general sound-absorbing material is manufactured by foaming material such as polyurethane or the like. The foreign material reaches up to the sound-absorbing material layer when a foreign material such as a nail or the like penetrates the tire if the sound-absorbing material is adhered to a sealant applied to a tire inner liner, such fine pieces of the sound-absorbing material act as a factor of hindering sealing ability of the sealant by detaching the nail in a state that fine pieces of the sound-absorbing material are adhered to the nail due to sticking characteristics of the sealant when pulling out the nail, or the sound-absorbing material layer having fine pores densely formed therein and a sealant upper layer are densely physically coupled to the sealant layer to result in a drop in flowability of the sealant, thereby deteriorating function of the sealant.

When the sound-absorbing material is disposed not at a position of the inner liner, but at a position to which the sealant is not applied, or is wound around a wheel in order to solve such a problem, sound absorption performance of the sound-absorbing material may be significantly deteriorated, and use problems may be caused since the sound-absorbing material gets in the way even when mounting the tire on the wheel.

Further, although it is necessary to install a separate structure for separating the sound-absorbing material layer and the sealant layer or install separate structures for preventing the sound-absorbing material layer from being coupled with the sealant layer when the sound-absorbing material layer is compressed during driving, it is a technique which is not suitable for a rotating tire to install a separate structure.

Thus, a tire according to the present disclosure improves flowability of the sealant by increasing an average pore size of the sound-absorbing material, thereby reducing a specific surface area between the sealant and the sound-absorbing material, and not only prevents fine pieces of the sound-absorbing material from deteriorating function of the sealant, but also enables noise reduction performance to be maintained by decreasing adhesion specific surface area between the surface of the nail and the sound-absorbing material even when a nail reaches the sound-absorbing material by penetrating the tire and sealant.

FIG. 1 is a cutting perspective view illustrating a pneumatic tire according to an embodiment of the present disclosure. Referring to FIG. 1, a tire 1 according to the present disclosure includes a sealant layer 2 applied to an inner surface of the tire and a sound-absorbing material layer 3 adhered to the sealant layer 2.

The sealant layer 2 is applied to the inner surface of the tire 1, and when the tire 1 includes an inner liner in an inner side thereof, the sealant layer 2 may be positioned on the inner liner.

The sealant layer 2 may be applied to a partial surface or an entire surface of the inner surface of the tire 1, preferably an inner surface only corresponding to a grounding surface of the tire 1. The reason for this is that a portion of the tire 1 which is mainly penetrated by a foreign material is the grounding surface of the tire 1. Therefore, width of the sealant layer 2 may be 100 to 120 length % with respect to breadth of a tread part of the tire 1.

Further, the sealant layer 2 may have a thickness of 2 to 8 mm. When the sealant layer 2 has a thickness within the range, the sealant layer 2 can securely self-seal the puncture when a tire puncture occurs by a nail or a protrusion without affecting flow properties of the sealant.

The sealant layer 2 can be manufactured without performing a crosslinking reaction of a sealant composition comprising a rubber component or crosslinking a sealant composition comprising a crosslinking rubber component. The sealant composition is not limited if it has adhesive properties, but may include a general rubber composition used in sealing of a puncture of the tire 1.

For example, the sealant composition may include a sealant composition comprising a butyl-based rubber as a main component, and may additionally include a sealant composition comprising a natural rubber-based compound, a silicone-based compound, a urethane-based compound, a styrene-based compound, or an ethylene-based compound.

The butyl-based rubber may include butyl rubber (IIR), or halogenated butyl rubber (X-IIR) such as butyl bromide rubber (Br-IIR), butyl chloride rubber (Cl-IIR), etc.

Further, the sealant composition, as a rubber component, may further comprise diene-based rubbers including natural rubber (NR), isoprene rubber (IR), butadiene rubber (BR), styrene-butadiene rubber (CBR), styrene-isoprene-butadiene rubber (SIBR), ethylene propylene diene monomer (EPDM) rubber, chloroprene rubber (CR), acrylonitrile butadiene rubber (NBR), etc. However, it is preferable in terms of fluidity or the like that the sealant composition comprises 90 wt % or more of the butyl-based rubber with respect to 100 wt % of the rubber component.

The sealant composition may further comprise polyisobutylene, and the polyisobutylene may have a weight average molecular weight of 1,000 to 10,000 g/mol. Further, the polyisobutylene may be included in an amount of 100 to 500 parts by weight with respect to 100 parts by weight of the rubber component. Flowability of material may be deteriorated when the polyisobutylene is included in an amount of less than 100 parts by weight, while shape stability of the material may be deteriorated when the polyisobutylene is included in an amount of more than 500 parts by weight.

On the other hand, the sealant composition may further comprise a liquid polymer. The liquid polymer may be liquid polybutene, liquid polyisobutene, liquid polyisoprene, liquid polybutadiene, liquid poly α-olefin, liquid isobutylene, liquid ethylene α-olefin copolymer, liquid ethylene propylene copolymer, liquid ethylene butylene copolymer, or the like. The liquid polymer may be included in an amount of 50 to 1,000 parts by weight, more specifically 150 to 500 parts by weight with respect to 100 parts by weight of the rubber component. Flowability of material may be deteriorated when the liquid polymer is included in an amount of less than 50 parts by weight, while shape stability of the material may be deteriorated when the liquid polymer is included in an amount of more than 1,000 parts by weight.

The sealant composition may further comprise an inorganic additive. The inorganic additive, which is for adjusting reinforcement properties of the sealant composition, may be selected from the group consisting of carbon black, silica, calcium carbonate, calcium silicate, magnesium oxide, aluminum oxide, barium sulfate, talc, mica, and mixtures thereof. In this case, the inorganic additive may be included in an amount of 10 to 100 parts by weight, preferably 30 to 60 parts by weight with respect to 100 parts by weight of the rubber component.

Further, the sealant composition may further comprise an additive selected from the group consisting of a vulcanizing agent, a vulcanization accelerator, a vulcanization acceleration aid, an adhesive, and mixtures thereof.

The vulcanizing agent, which helps crosslinking of the sealant composition, may be included in an amount of 1 to 20 parts by weight, preferably 5 to 10 parts by weight with respect to 100 parts by weight of the rubber component.

The vulcanizing agent may include a sulfur-based vulcanizing agent, an organic peroxide, bismaleimides, a benzoquinone derivative, a phenolic vulcanizing agent, and metal oxides such as magnesium oxide and the like. The sulfur-based vulcanizing agent may include an inorganic vulcanizing agent such as sulfur (S) powder, insoluble sulfur (S), precipitated sulfur (S), colloidal sulfur, etc.

The vulcanization accelerator for accelerating a vulcanization process may include any one selected from the group consisting of a sulfenamide-based vulcanization accelerator, a thiazole-based vulcanization accelerator, a thiuram-based vulcanization accelerator, a thiourea-based vulcanization accelerator, a guanidine-based vulcanization accelerator, a dithiocarbamic acid-based vulcanization accelerator, an aldehyde-amine based vulcanization accelerator, an aldehyde-ammonia based vulcanization accelerator, an imidazoline-based vulcanization accelerator, a xanthate-based vulcanization accelerator, and combinations thereof. In this case, the vulcanization accelerator may be included in an amount of 0 to 10 parts by weight, preferably 3 to 5 parts by weight with respect to 100 parts by weight of the rubber component.

The vulcanization acceleration aid, as a compounding agent which is used in a combination with the vulcanization accelerator to complete its acceleration effect, may include zinc oxide and stearic acid which are used together. The zinc oxide and the stearic acid may respectively be used in amounts of 1 to 5 parts by weight and 0.5 to 3 parts by weight with respect to 100 parts by weight of the rubber component in order to perform an appropriate role as the vulcanization acceleration aid when the zinc oxide and the stearic acid are used together.

Further, the adhesive for improving adhesive strength of the sealant composition may include a natural resin-based adhesive such as a phenolic resin, a rosin-based resin or a terpene-based resin, and a synthetic resin-based adhesive such as petroleum resin, coal tar, alkyl phenolic resin, etc. In this case, the adhesive may be included in an amount of 0 to 10 parts by weight, preferably 3 to 5 parts by weight with respect to 100 parts by weight of the rubber component.

Meanwhile, the sound-absorbing material layer 3 is for reducing resonance sound generated in an inner space of the tire 1, and the sound-absorbing material layer 3 may have a sheet shape extended in a circumferential direction of the tire 1. Namely, the sound-absorbing material layer 3 as a sheet shape is extended along the circumferential direction of the tire 1, and both ends of the sound-absorbing material layer 3 meet each other to form a ring shape as the tire 1.

Further, the sound-absorbing material layer 3 may have a thickness of 20 to 60 mm, more specifically 30 to 60 mm, and may have a breadth (width) of 10 to 120% with respect to breadth of a tread part of the tire 1. Noise reduction performance may be deteriorated when the sound-absorbing material layer 3 has a thickness of less than 35 mm, while the sound-absorbing material may be worn out by friction of the sound-absorbing material with a rim surface facing the sound-absorbing material within the tire during driving when the sound-absorbing material layer 3 has a thickness of more than 60 mm.

The sound-absorbing material layer 3 includes a first porous material 31 having an average pore size of 1,200 to 2,400 µm.

Namely, the first porous material 31 has a large average pore size compared to that of a porous material which has conventionally been used as the sound-absorbing material, and the first porous material 31 improves flowability of the sealant by reducing a specific surface area between the sealant layer 2 and the sound-absorbing material layer 3, and not only prevents fine pieces of the first porous material 31 from deteriorating function of the sealant, but also enables noise reduction performance to be maintained by decreasing adhesion specific surface area between the surface of the nail and the first porous material 31 even when a foreign material such as a nail or the like reaches the sound-absorbing material layer 3 by penetrating the tire 1 and the sealant layer 2.

Flowability of the sealant brought into contact with the surface may be deteriorated when the first porous material 31 has an average pore size of less than 1,200 μm, while durability of the sound-absorbing material during driving may be lowered when the first porous material 31 has an average pore size of more than 2,400 μm.

The porous material may be any one selected from the group consisting of a porous nonwoven fabric, a porous foam, and a laminate thereof.

Specifically, the porous nonwoven fabric may be a polyester-based nonwoven fabric or a polystyrene-based nonwoven fabric, and the porous foam may be a synthetic resin foam including an ether-based polyurethane foam, i.e., a polyurethane foam using a polyether polyol as raw material, an ester-based polyurethane foam, i.e., a polyurethane foam using a polyester polyol as raw material, an ether/ester-based polyurethane foam, i.e., a polyurethane foam using a polyester polyether polyol as raw material, a polyethylene foam, or the like, and a rubber foam including an ethylene propylene diene monomer rubber foam (EPDM rubber foam), a nitrile butadiene rubber foam (NBR rubber foam), or the like.

The polyurethane foam may generally be manufactured by performing a urethane reaction process of a polyisocyanate compound and a polyol (polyhydroxy compound).

The sound-absorbing material layer 3 may additionally include a second porous material 32 stacked on the first porous material 31.

Figure 2:
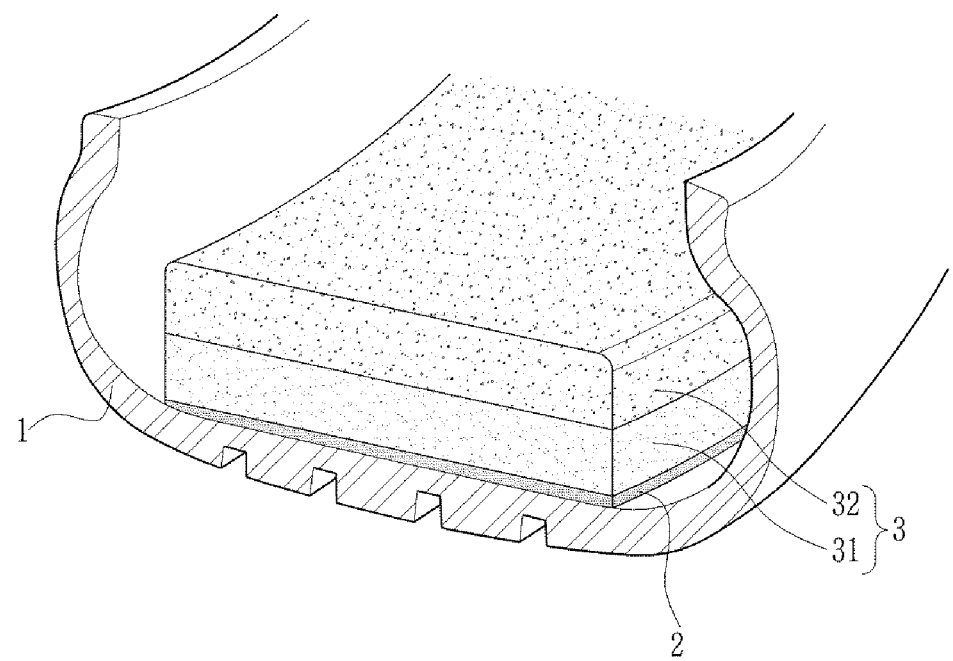
FIG. 2 is a cutting perspective view illustrating a tire according to the other embodiment of the present disclosure.

FIG. 2, as a cutting perspective view illustrating a pneumatic tire according to the other embodiment of the present disclosure, illustrates a case of additionally including the second porous material 32.

Referring to FIG. 2, one surface of the first porous material 31 is adhered to an inner surface of the tire 1 by the sealant layer 2, and the second porous material 32 is stacked on the other surface of the first porous material 31.

The second porous material 32 may have an average pore size of 100 to 1,200 μm, more specifically 300 to 1,000 μm.

Namely, the average pore size of the second porous material 32 is smaller than that of the first porous material 31. Accordingly, the first porous material 31 contributes to noise reduction while minimizing fluidity disturbance of the sealant layer 2 since the average pore size of the first porous material 31 is relatively large compared to that of the second porous material 32, and the second porous material 32 may have a larger noise reduction performance than the first porous material 31 since the average pore size of the second porous material 32 is relatively small compared to that of the first porous material 31.

In this case, the first porous material 31 may have a thickness of 10 to 100 length %, more specifically 30 to 90 length % with respect to the total thickness of the sound-absorbing material layer 3. Self-sealing performance may be deteriorated since fine sound-absorbing material pieces are drawn out along with the nail when the nail is pulled out after a penetrated nail comes into contact with the second porous material 32, while noise reduction performance may be deteriorated when the first porous material 31 has a thickness of 100 length % compared to less than 100 length %.

Further, the first porous material 31 may have a density of 25 to 40 kg/m³, a hardness of 10 to 20 kgf, a tensile strength of 0.8 kgf/cm² or more, and an elongation rate of 70% or more.

Durability may be lowered when the first porous material 31 has a density of less than 25 kg/m³, while tire performance may be affected since weight of the sound-absorbing material is increased when the first porous material 31 has a density of more than 40 kg/m³. Processability may be lowered when the first porous material 31 has a hardness of less than 10 kgf or more than 20 kgf. Durability may be lowered when the first porous material 31 has a tensile strength of less than 0.8 kgf/cm², and durability may be lowered when the first porous material 31 has an elongation rate of less than 70%.

The second porous material 32 may have a density of 20 to 40 kg/m³, a hardness of 10 to 20 kgf, a tensile strength of 0.8 kgf/cm² or more, and an elongation rate of 70% or more.

Durability may be lowered when the second porous material 32 has a density of less than 20 kg/m³, while tire performance may be affected since weight is increased when the second porous material 32 has a density of more than 40 kg/m³. Processability may be lowered when the second porous material 32 has a hardness of less than 10 kgf or more than 20 kgf. Durability may be lowered when the second porous material 32 has a tensile strength of less than 0.8 kgf/cm², and durability may be lowered when the second porous material 32 has an elongation rate of less than 70%.

The first porous material 31 and the second porous material 32 may be adhered by various methods. For example, the second porous material 32 may be adhered to the first porous material 31 by an adhesive, a double-sided adhesive tape or the like.

Since the second porous material 32 is the same as the first porous material 31 in description of material and so on except that the second porous material 32 is different from the first porous material 31 in the average pore size, density, etc., repetitive explanation will be omitted.

Hereinafter, the embodiments of the present disclosure will be described in detail so that the present disclosure can be easily realized by those skilled in the art. However, the present disclosure can be implemented in various different forms and is not limited to the embodiments described herein.

Manufacturing Example: Manufacturing Tires

A first porous material and a second porous material having the same physical properties as in the following Table 1 were prepared.

TABLE 1

| | Unit | Second porous material | First porous material |
|---|---|---|---|
| Density | Kg/m³ | 28 | 30 |
| Hardness (ILD25%) | kgf | 12 | 18 |
| Tensile strength | Kgf/cm² | 1.31 | 1.0 |
| Elongation rate | % | 250 | 83 |
| Average pore size | μm | 800 | 1850 |

Hardness: JIS K 6400-2
Tensile strength, elongation rate: JIS K6400-5
Density: JIS K7222

Further, after mixing 100 parts by weight of butyl rubber, 400 parts by weight of polyisobutylene, 40 parts by weight of a carbon black additive and 2 parts by weight of a sulfur-based vulcanizing agent to prepare a sealant composition, and applying the sealant composition to an inner surface of 195/65R15 tire, tires were manufactured by adhering a porous material to the sealant composition applied to the inner surface of 195/65R15 tire as shown in Table 2 below.

In the following Table 2, Comparative Example 1 is a case that does not include the sound-absorbing material layer, Comparative Example 2 is a case that the sound-absorbing material layer is formed by adhering the second porous material only, Example 1 is a case that the sound-absorbing material layer is formed by adhering the first porous material only, and Example 2 is a case that the sound-absorbing material layer is formed by adhering the first porous material to a sealant layer, and adhering the second porous material to the first porous material using an adhesive, thereby stacking the second porous material on the first porous material. The total thicknesses of the sound-absorbing material layers of Comparative Example 2, example 1 and Example 2 are the same as each other.

TABLE 2

|  | First porous material (thickness) | Second porous material (thickness) | Total thickness of sound-absorbing material layer |
|---|---|---|---|
| Comparative Example 1 | — | — | — |
| Comparative Example 2 | — | 35 mm | 35 mm |
| Example 1 | 35 mm | — | 35 mm |
| Example 2 | 25 mm | 10 mm | 35 mm |

Experimental Example: Measuring Performance of Tires

After proceeding a noise test, a sealing effect test, a high-speed durability test and an adhesion durability test with respect to the manufactured tires, test results are shown in the following Table 3 and FIG. 3. Comparative Example in FIG. 3 indicates the Comparative Example 2.

TABLE 3

| Classification | Comparative Example 1 | Comparative Example 2 | Example 1 | Example 2 |
|---|---|---|---|---|
| Noise (dB) | 1.386 | 0.596 | 0.651 | 0.598 |
|  | 100% | 43% | 47% | 43% |
| Sealing effect | 100% | 22% | 100% | 100% |
| High-speed durability test | — | Maintaining the shape | Maintaining the shape | Maintaining the shape |
| Adhesion durability test | — | Maintaining the adhesion | Maintaining the adhesion | Maintaining the adhesion |

Noise test: resonance sounds within the tires were measured through changes in vertical directional force magnitudes at central axes of tires/wheels while passing through a cleat at predetermined intervals using cleat impact test equipment (the cleat impact test equipment: a testing machine for measuring vibration responses and vibration attenuation of an axle or a suspension when tires or assemblies of the tires and suspensions receive an impact of the cleat).

Sealing effect: after driving total 9 nails including 3 small-sized nails with a body diameter of 2.5 mm, 3 middle-sized nails with a body diameter of 3.4 mm, and 3 large-sized nails with a body diameter of 5.0 mm specially manufactured to confirm self-sealing performance of sealant-applied tires into tread portions in which the sealant was applied to inner parts of the tires, the nails were pulled out from the tread portions to measure air pressures. A case that is free from air leakage by having the same pressure as an initial air pressure was indicated by 100%.

High-speed and adhesion durability tests: after performing tests by decelerating speed to 100 km/h or accelerating the speed to 100 km/h at predetermined repetition intervals in 240 km/h high speed driving for 34 hours, adhesive properties of the sound-absorbing material layer and whether shape of the sound-absorbing material layer had been maintained or not were measured with the naked eye.

Figure 3:
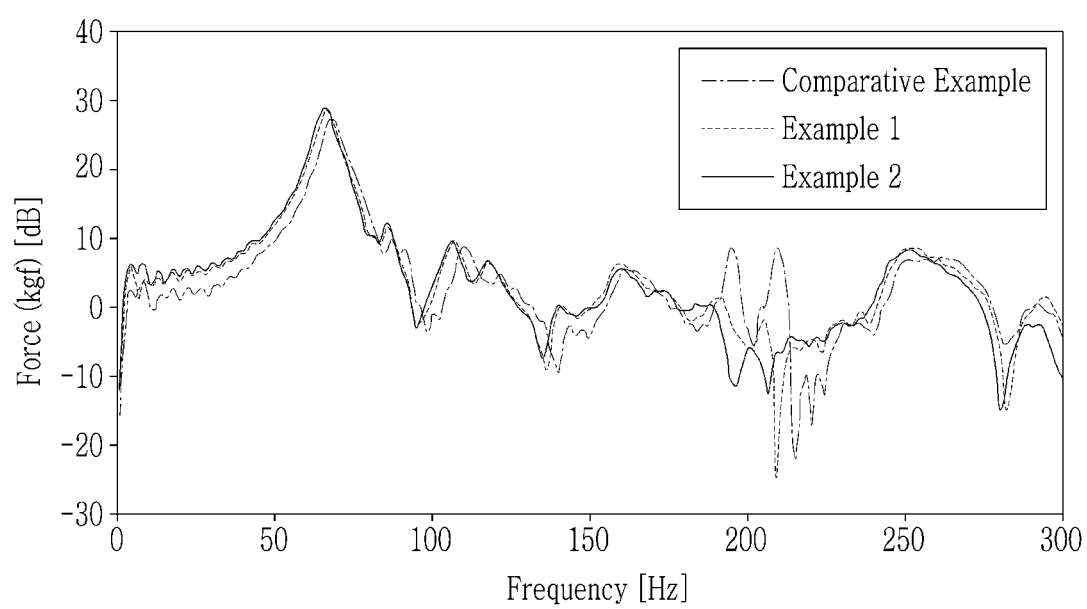
FIG. 3 is a graph showing noise measurement results of a tire in Experimental Example 1.

Referring to Table 3 and FIG. 3, it can be seen that sealing effects have been improved in the tires manufactured in Examples 1 and 2 compared to the tire manufactured in Comparative Example 2. The reason for this is that the tires manufactured in Examples 1 and 2 improve flowability of the sealant by applying the first porous material as the sound-absorbing material layer, thereby reducing specific surface area between the sealant and the sound-absorbing material, and prevent fine pieces of the sound-absorbing material from deteriorating function of the sealant by reducing adhesion specific surface area between the surface of the nail and the sound-absorbing material even when the nail reaches the sound-absorbing material by penetrating the tire and the sealant.

Further, it can be seen that noise performance has been improved in the tires manufactured in Examples 1 and 2 compared to the tire manufactured in Comparative Example 1, and noise performance has been further improved in the tire manufactured in Example 2 compared to the tire manufactured in Example 1. It seems that an increase in average pore size of the sound-absorbing material is thought to be obtaining effects of preventing sealant functional drop and improving noise reduction performance. Accordingly, a sound absorbing effect required for each size of the tires can be adjusted by adjusting ratio of a first porous sound-absorbing material to a second porous sound-absorbing material or adjusting thickness of the second porous sound-absorbing material.

Hereinabove, exemplary embodiments of the present disclosure have been described in detail. However, the scope of the present disclosure is not limited thereto, but various changes or modified forms of those skilled in the art using a basic concept of the present disclosure defined in the following claims can also be within the scope of the present disclosure.

EXPLANATION OF MARKS

1: Tire
2: Sealant layer
3: Sound-absorbing material layer
31: First porous material
32: second porous material

The invention claimed is:
1. A tire including:
a sound-absorbing material layer which is adhered to an inner surface of the tire; and
a sealant layer which is disposed between the inner surface of the tire and the sound-absorbing material layer and includes a sealant for adhering the sound-absorbing material layer to the inner surface of the tire, wherein the sound-absorbing material layer includes a first porous material having an average pore size of 1,200 to 2,400 µm,
wherein the sound-absorbing material layer additionally includes a second porous material having an average pore size of 100 to 1,200 µm stacked on the first porous material, the average pore size of the second porous material is smaller than that of the first porous material, a first surface of the first porous material is adhered to the inner surface of the tire by the sealant layer, and the second porous material is stacked on a second surface of the first porous material that is opposite the first surface, and wherein the sound-absorbing material layer has a thickness of 20 to 60 mm, and a thickness of the first porous material is 30 to 90 length % of the total thickness of the sound-absorbing material layer.

2. The tire of claim 1, wherein the first porous material has a density of 25 to 40 kg/m³, a hardness of 10 to 20 kgf, a tensile strength of 0.8 kgf/cm² or more, and an elongation rate of 70% or more, and the second porous material has a density of 20 to 40 kg/m³, a hardness of 10 to 20 kgf, a tensile strength of 0.8 kgf/cm² or more, and an elongation rate of 70% or more.

* * * * *